United States Patent [19]

Gunter et al.

[11] 4,314,353

[45] Feb. 2, 1982

[54] ON CHIP RAM INTERCONNECT TO MPU BUS

[75] Inventors: Thomas G. Gunter; Fuad H. Musa; Wm. B. Wilder, Jr., all of Austin; Michael F. Wiles, Round Rock, all of Tex.

[73] Assignee: Motorola Inc., Schaumburg, Ill.

[21] Appl. No.: 884,947

[22] Filed: Mar. 9, 1978

[51] Int. Cl.³ .............................................. G06F 13/06
[52] U.S. Cl. ....................................... 364/900; 365/72
[58] Field of Search ... 364/200 MS File, 900 MS File; 365/72, 189; 307/DIG. 5

[56] References Cited

U.S. PATENT DOCUMENTS

| | | | |
|---|---|---|---|
| 3,411,139 | 11/1968 | Lynch et al. | 364/200 |
| 3,757,306 | 9/1973 | Boone | 364/200 |
| 3,757,308 | 9/1973 | Fosdick | 364/200 |
| 3,821,715 | 6/1974 | Hoff et al. | 364/200 |
| 3,882,470 | 5/1975 | Hunter | 364/900 |
| 3,892,957 | 7/1975 | Bryant | 364/200 X |
| 3,896,419 | 7/1975 | Lange et al. | 364/200 |
| 3,934,230 | 1/1976 | Salle et al. | 364/200 |
| 3,938,098 | 2/1976 | Garlic | 364/200 |
| 3,939,455 | 2/1976 | Toyosawa | 364/200 |
| 3,950,736 | 4/1976 | Dix et al. | 364/900 |
| 3,959,774 | 5/1976 | Mead | 364/200 |
| 4,016,546 | 4/1977 | Bennett et al. | 364/200 |
| 4,021,781 | 5/1977 | Caudel | 364/900 |
| 4,024,509 | 5/1977 | Elmer | 364/200 |
| 4,087,854 | 5/1978 | Kinoshita et al. | 364/200 |
| 4,106,090 | 8/1978 | Erickson et al. | 346/200 |
| 4,144,561 | 3/1979 | Tu et al. | 364/200 |
| 4,144,563 | 3/1979 | Heuer et al. | 364/200 |
| 4,153,933 | 5/1979 | Blume, Jr. et al. | 364/200 |
| 4,155,118 | 5/1979 | Lamiaux | 364/200 |
| 4,181,938 | 1/1980 | Suzuki et al. | 364/200 |
| 4,194,241 | 3/1980 | Mager | 364/200 |

FOREIGN PATENT DOCUMENTS 1410082 10/1975 United Kingdom .

OTHER PUBLICATIONS

"Operation of the AM9130/40 4K Static RAMs", Kroeger, J. H., New Electronics, vol. 9, No. 19, pp. 38, 41, 43, Oct. 5, 1976.

Tarui et al., "Twelve-Bit Microprocessor nears Minicomputer's Performance Level", in Electronics, Mar. 21, 1974, pp. 111-116.

Altman, "Single-Chip Microprocessor Open Up a New World of Applications", in Electronics, Apr. 18, 1974, pp. 81-87.

Reyling, Jr., "Single-Chip Microprocessor Employs Minicomputer Word Length", in Electronics, Dec. 26, 1974, pp. 87-93.

Primary Examiner—Gareth D. Shaw
Assistant Examiner—Eddie P. Chan
Attorney, Agent, or Firm—Joe E. Barbee

[57] ABSTRACT

A microprocessor interconnected to a RAM on the same integrated circuit chip. Interconnect circuitry connects the RAM to the microprocessor data bus to allow RAM data to be transferred to an instruction register of the microprocessor which permits the RAM to contain instructions and operation codes. A sense amplifier is used to provide an output from the RAM. At least one buffer is coupled to the output of the sense amplifier. A bilateral switch is coupled to the at least one buffer and controllably switches the output of the at least one buffer to the microprocessor internal data bus and to an external data bus.

7 Claims, 5 Drawing Figures

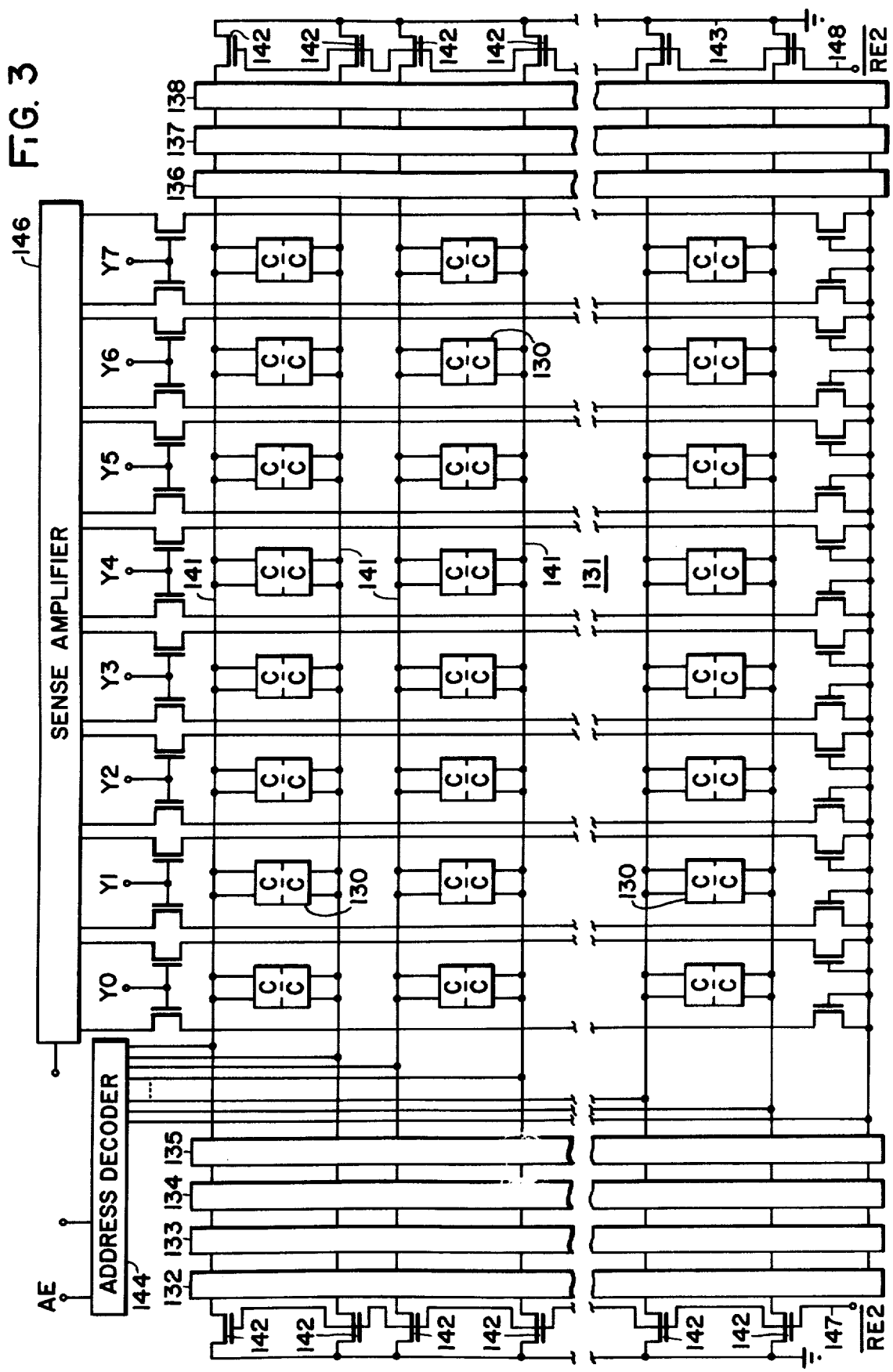

ON CHIP RAM INTERCONNECT TO MPU BUS

CROSS REFERENCE TO RELATED APPLICATIONS

For related applications see "RAM Retention During Power Up and Power Down" application Ser. No. 884,790, now U.S. Pat. No. 4,145,761; and "RAM Address Enable Circuit" application Ser. No. 884,944, both assigned to the same assignee and filed on the same date as the present application.

BACKGROUND OF THE INVENTION

This invention relates, in general, to microprocessors, and more particularly, to those microprocessors having an on-chip random access memory (RAM).

Microprocessors have gained wide acceptance and have proven very useful in many applications. In most cases, a microprocessor is used in conjunction with external memories which contain instructions and opcodes. Advances in LSI techniques have allowed inclusion of memories on the same chip as a microprocessor; however, the memories had limited utility since they were mainly used for temporary storage of data. It would be highly desirable to have a random access memory (RAM) located on the same integrated circuit chip as the microprocessor and interconnected in a manner to allow data from the RAM to be coupled onto the internal microprocessor data bus. In addition, in many applications it is desirable to be able to retain some of the information contained in the RAM when the microprocessor power is down. This is particularly true of microprocessors used in automobiles.

Accordingly, it is an object of the present invention to provide circuitry to interconnect a RAM to a microprocessor internal data bus wherein both, RAM and microprocessor, are on the same chip to permit data from the RAM to be inputted to the microprocessor internal data bus.

Another object of the present invention is to provide the capability which allows a microprocessor to read the contents of a RAM onto an internal microprocessor data bus and to an external data bus which is external to the microprocessor.

Yet another object is to provide a single integrated circuit chip having a microprocessor and a RAM wherein the RAM contains instructions.

A further object of the present invention is to provide a method by which the contents of a RAM can be coupled to a microprocessor instruction register via an internal data bus of the microprocessor.

SUMMARY OF THE INVENTION

In carrying out the above and other objects of the invention in one form, there is provided a microprocessor unit (MPU) having an on-chip RAM and including circuitry to interconnect the RAM to the internal data bus of the microprocessor. A sense amplifier is coupled to the RAM and provides an output for the RAM. At least one buffer is used to couple the output of the sense amplifier to a bilateral switch which can controllably switch the output of the at least one buffer to the microprocessor bus and to an external data bus.

Also provided is a method for entering data from a RAM to a microprocessor when the RAM and microprocessor are contained on a single integrated circuit chip. Data is selected from a RAM location. The data is coupled from a sense amplifier to a bilateral switch and is then controllably switched to a microprocessor bus thereby allowing RAM data to be transferred to an instruction register of the microprocessor.

The subject matter which is regarded as the invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 3 is a block diagram of the RAM of FIG. 1; and

The exemplification set out herein illustrates the preferred embodiment of the invention in one form thereof, and such exemplification is not to be construed as limiting in any manner.

DESCRIPTION OF THE PREFERRED EMBODIMENTS

Placing a RAM on the same integrated circuit chip as a microprocessor makes greater use of the integrated circuit chip area and advances in MOS large scale integration (LSI) techniques have allowed such. However, being able to input data from the RAM onto a microprocessor internal bus greatly enhances the utility of the chip. A method for entering data from a RAM to a microprocessor when the RAM and microprocessor are contained on a single integrated circuit chip includes selecting data from a RAM location, and coupling the data from a sense amplifier to a bilateral switch. The bilateral switch is then controllably switched to permit the data from the RAM to be transferred to the microprocessor data bus. The data is then accessible to the instruction register of the microprocessor thereby permitting the RAM to contain instructions and operation codes. A portion of the RAM is powered by a standby power supply which remains energized when the microprocessor's power is removed. This permits the RAM to retain the data stored therein. Access to the RAM during power up and power down conditions is inhibited to ensure that the data contained within the RAM is not destroyed nor modified.

Figure 1:
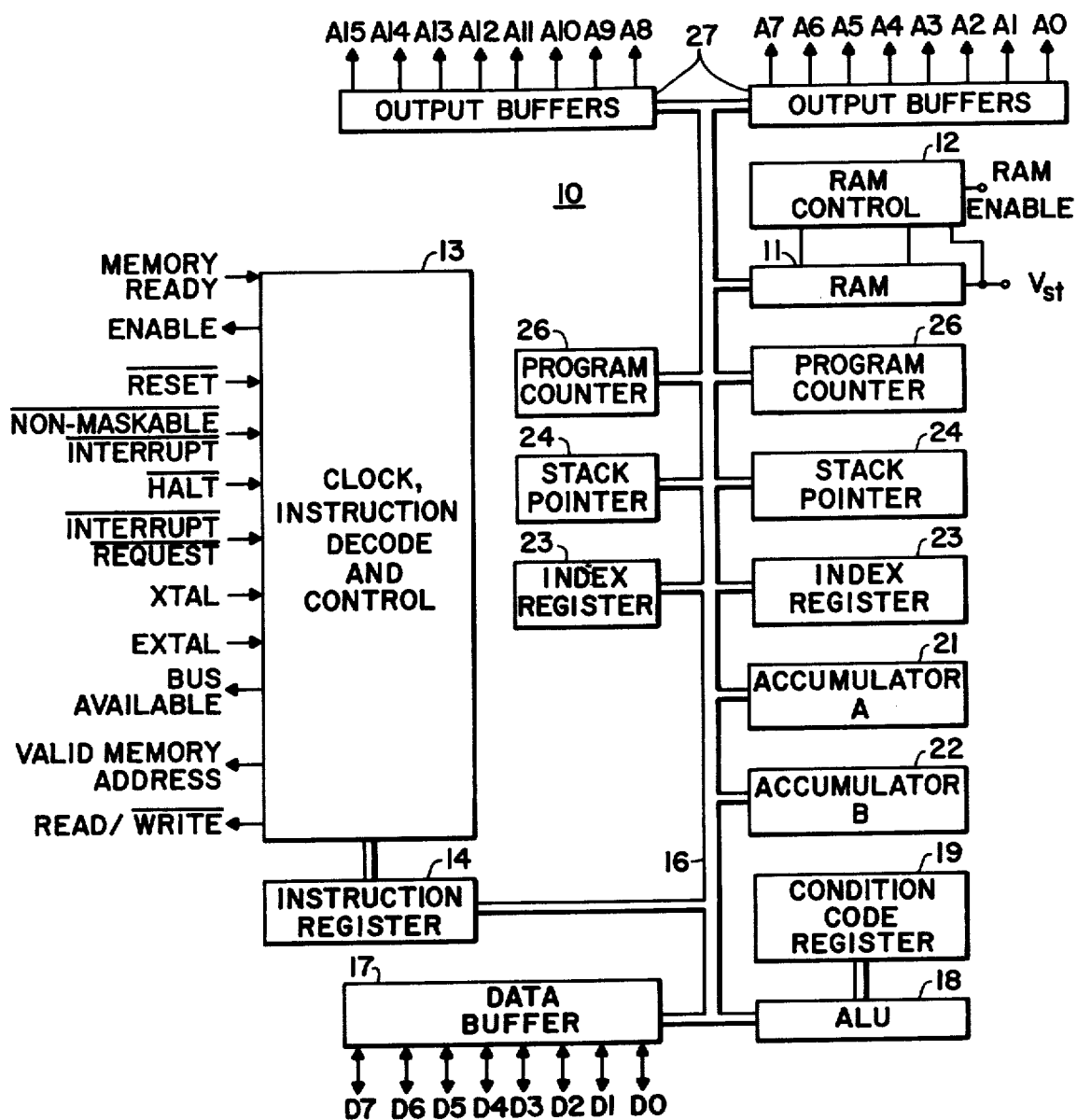
FIG. 1 is a block diagram of a microprocessor having an on-chip RAM.

FIG. 1 illustrates a microprocessor unit 10 along with RAM 11 all being on the same integrated circuit chip. Associated with RAM 11 is RAM control unit 12. A portion of the RAM, or all of the RAM if desired, can be powered by a standby voltage $V_{ST}$. Access to the RAM is controlled by a RAM enable signal supplied to RAM control 12. The microprocessor contains clock, instruction decode, and control circuitry 13 which is connected to an internal microprocessor data bus 16 by way of an instruction register 14. Instruction decoding control circuitry 13 receives several external signals which will be discussed in greater detail hereinafter. Data is inputted and outputted to the microprocessor by way of data buffers 17.

A condition code register 19 is coupled to arithmetic logic unit 18 and indicates the results of arithmetic logic unit 18. The results generated by condition code register 19 are in bit form and may be used as testable conditions, for example, for conditional branch instructions.

Program counter 26 is a two byte (for example, 16-bits) register that points to a current program address. Stack pointer 24 is a two byte register that contains the address of the next available location in an external pushdown/pop-up stack. The external stack is normally a random access read/write memory that may have any location or address that is convenient. The microprocessor also contains an index register 23 which is a two byte register used to store data or a 16 bit memory address for the indexed mode of memory addressing. Microprocessor unit 10 contains two 8 bit accumulators 21 and 22 that are used to hold operands and results from arithmetic logic unit 18. Program counter 26, stack pointer 24, index register 23, accumulators 21 and 22, and arithmetic logic unit 18 are all connected to internal microprocessor data bus 16. Microprocessor internal data bus 16 is also connected to address or output buffers 27. Sixteen output pins are used for the address bus. Output or external data buffer 17 uses eight pins and serves as a buffer for external data into and out of data bus 16. Data buffer 17 is bidirectional, transferring data to and from peripheral devices and external memories, if any. As will be more apparent hereinafter data buffer 17 includes eight individual buffers and its interface connections form an external data bus for an external interface.

A complete schematic of microprocessor unit 10 without RAM 11 and RAM control 12 can be found in U.S. Pat. No. 3,962,682 to Thomas H. Bennett. U.S. Pat. No. 3,962,682 is assigned to the same assignee as the present invention and is hereby incorporated herein by reference. Microprocessor unit 10 is a small computer with an 8 bit data word and 16-bit memory addressing. $\overline{Halt}$ is an input to instruction decode and control unit 13. When $\overline{Halt}$ is in a logical low state or "0" state all activity in the microprocessor will be halted. $\overline{Halt}$ is level sensitive. In the halt mode, the microprocessor will stop at the end of an instruction, Bus Available will be in a high state, and Valid Memory Address (VMA) will be in a low state. The address bus which is connected to output buffers 27 will display the address of the next instruction. Read/Write, ($\overline{R/W}$), is an output from control unit 13 and signals any peripheral units and external memory devices as to whether the microprocessor is in a read or write state. Read is a logic high level while write is a logic low. The normal standby state of Read/$\overline{Write}$ is a logical "1" or high state. Another output of control unit 13 is Valid Memory Address (VMA) which indicates to any peripheral devices that there is a valid address on the address bus. In normal operation, this signal should be used for enabling peripheral interfaces such as a peripheral interface adaptor (PIA) and asynchronous communications interface adaptor (ACIA). Another output of control unit 13 is a Bus Available signal which is normally in a logical low state. When the Bus Available (BA) signal is activated it will go to a logical high state indicating that the microprocessor has stopped and that the address bus is available. This will occur if the $\overline{Halt}$ line is in a logical low state or the microprocessor is in the WAIT state as a result of the execution of a WAIT instruction. Interrupt Request ($\overline{IRQ}$) is a level sensitive input to control unit 13 which requests that an interrupt sequence be generated within the microprocessor. The processor will wait until it completes the current instruction that is being executed before it recognizes the request. Once the interrupt request is recognized the microprocessor will begin an interrupt sequence provided an interrupt mask bit in condition code register 19 is not set. Data in index register 23, program counter 26, accumulators 21 and 22, and condition code register 19 are stored away in a stacked memory. The microprocessor will then respond to the interrupt request by setting the interrupt mask bit high so that no further interrupts may occur. At the end of the cycle, a 16-bit address will be loaded that points to a vectoring address which is located in predetermined memory locations. An address loaded at these predetermined memory locations causes the microprocessor to branch to an interrupt routine in memory. The $\overline{Halt}$ line must be in a logical high state for interrupts to be recognized.

A $\overline{Reset}$ input to control unit 13 is used to reset and start the microprocessor from a power down condition. When the $\overline{Reset}$ input is in a logical low state the microprocessor unit is inactive and the information in the registers will be lost. If a logical high level is detected on the $\overline{Reset}$ input, the microprocessor will begin the restart sequence and all the higher order address lines will be forced high. During the restart routine, the interrupt mask bit is set and must be reset before the microprocessor can be interrupted by Interrupt Request. A Non-Maskable Interrupt ($\overline{NMI}$) signal is also inputted to control unit 13. A low going edge on the Non-Maskable Interrupt input requests that a non-mask-interrupt sequence be generated within the microprocessor. As with the Interrupt Request signal, the microprocessor will complete the current instruction that is being executed before it recognizes the Non-Maskable Interrupt signal. The interrupt mask bit in condition code register 19 has no effect on the Non-Maskable Interrupt request signal. The Interrupt Request and Non-Maskable Interrupt inputs are hardwire interrupt lines that are sampled when an enable signal is in a logical high state and will start the interrupt routine on a logical low enable signal following the completion of an instruction. The enable signal is an input to the control unit and supplies the clock for the microprocessor unit and the rest of the system.

An Xtal and EXtal inputs are also provided for control unit 13 and may be used for a parallel resonant fundamental crystal to provide crystal control for an internal oscillator. Control unit 13 also has a Memory Ready input signal which allows stretching of the enable signal. When the Memory Ready signal is a logical high level, the enable signal will be in normal operation. When Memory Ready signal is a logical low level the enable signal may be stretched integral multiples of half periods, thus allowing interface to slow memories.

A RAM Enable input signal to RAM control unit 12 controls the on-chip RAM. When the RAM Enable input signal is a logical high state the on-chip memory is enabled to respond to the microprocessor controls. The RAM is disabled when the RAM Enable signal is in a logical low state. As will be explained hereinafter the RAM Enable signal can be used to disable reading and writing the on-chip RAM during a powerdown situation. The RAM Enable signal should be in a logical low state three microseconds before the power to the microprocessor unit goes below a predetermined voltage level, such as 4.75 volts, during power down. A standby power voltage, $V_{ST}$, supplies the DC voltage to the RAM as well as to the RAM control logic 12. If it is not desired or necessary for all of the information in the RAM to be retained during a power down condition, the standby voltage need only be applied to that portion of the RAM in which it is desired to retain data during a power down condition.

Figure 2:
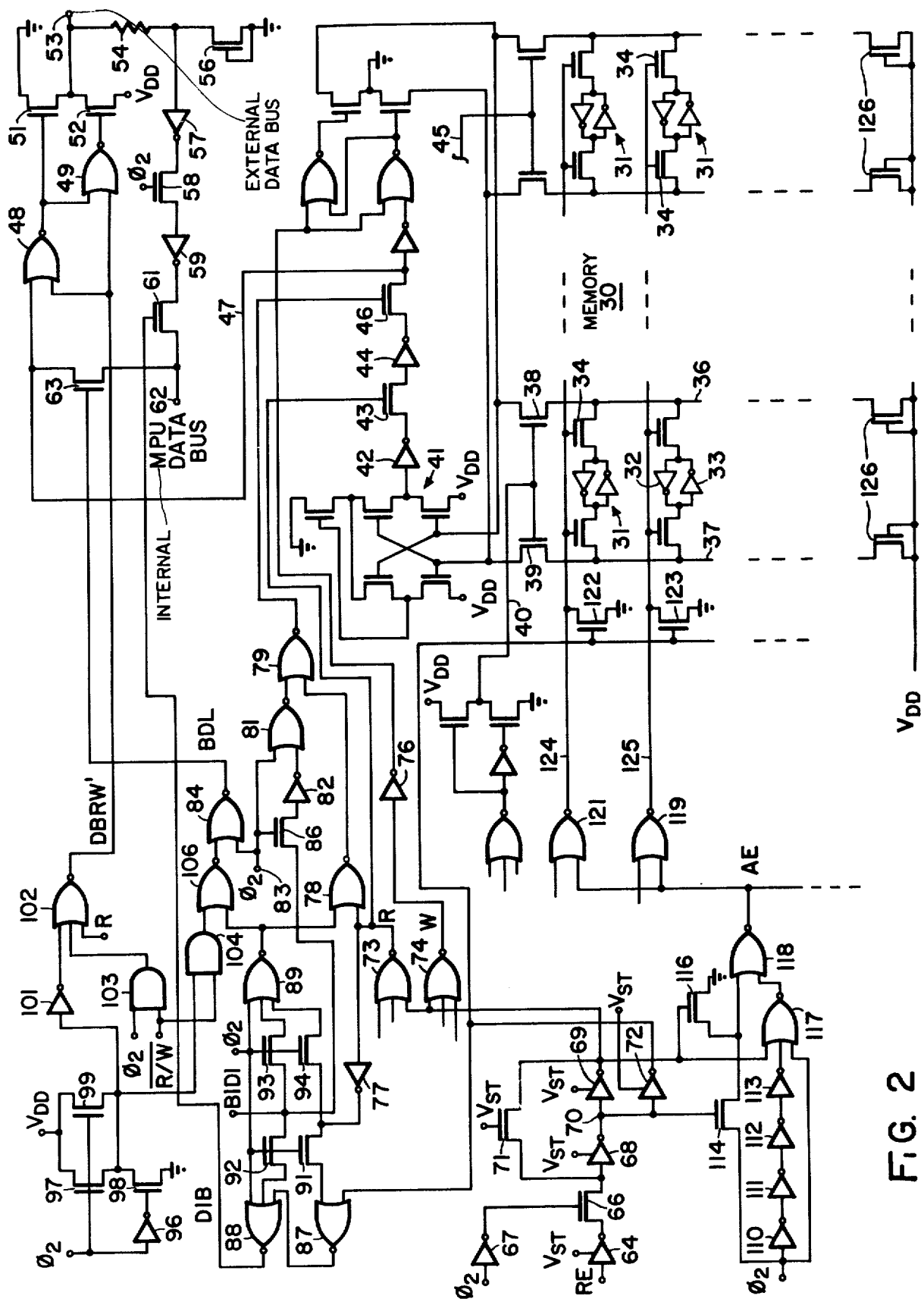
FIG. 2 is a logic diagram of a portion of the system of FIG. 1.

FIG. 2 illustrates in greater detail some of the circuitry of the system of FIG. 1. A portion of RAM 11 of FIG. 1 is illustrated as memory 30. In an 8-bit word system, memory 30 would contain eight columns of memory cells 31. The eight columns would have one sense amplifier 41. Each memory cell 31 contains two inverters 32 and 33 connected back-to-back. Data stored in memory cells 31 is transferred to column sense lines such as 36 and 37 by field effect transistor couplers 34. Couplers 34 are enabled by signals appearing on row select lines 124 and 125. A memory array for an 8-bit word system would not only have eight columns of memory cells 31 but would also have a number of rows of memory cells, such as 16, and each row would have a row select line such as 124 and 125.

Sense lines 36 and 37 are coupled to sense amplifier 41 by field effect transistors 38 and 39, respectively. Transistors 38 and 39 are energized by a column select signal appearing on line 40. Each column has its own column select signal lines such as 40 and 45. The output of cross coupled sense amplifier 41 is buffered by inverter 42. A read signal from logic NOR gate 73 enables field effect transistor 43 which couples the output of inverter buffer 42 to inverter 44. The output from buffer or inverter 44 is coupled by transistor 46 to line or conductor 47. Transistor 46 is enabled by a synchronous timing signal from logic NOR gate 79. Line 47 is connected to one input of logic NOR gate 48 while the other input of NOR gate 48 is connected to a timing signal. The output of NOR gate 48 goes to a control electrode of transistor 51 and to an input of NOR gate 49. NOR gate 49 also receives the same timing input signal as NOR gate 48. The output of NOR gate 49 is connected to a control electrode of transistor 52. Transistors 51 and 52 are connected in series between voltage source $V_{DD}$ and reference ground. A buffered output to the external data bus 53 is obtained from a node formed by the series connected transistors 51 and 52. Thus it can be seen that output data from the RAM can appear on external data bus 53. Each 8-bit section of the RAM memory has its own data buffer and external data bus terminal. The data out of the RAM carried by conductor 47 can also be coupled to the internal microprocessor data bus 62 by switching transistor 63 to a conductive state. Transistor 63 is controlled by an output signal from NOR gate 84. Data bus terminal 53 can also receive input data for the microprocessor. The input data is coupled by isolation resistor 54, inverter buffer 57, clocked transistor 58 and buffer/inverter 59. The input data is then controllably switched by transistor 61 which is controlled by an output signal from NOR gate 88. Data from internal microprocessor data bus 62 can also be written into the RAM when transistor 63 is enabled. When data is desired to be written into the RAM, transistors 43 and 46, of course, will not be enabled. Data appearing on line 47 is coupled to a NOR gate by an inverter. The NOR gates are enabled by a "write" signal and are coupled to the column sense lines. The desired column sense lines can be enabled by signals on conductors or lines such as 40 or 45. The column sense lines are connected by pull-up transistors 126 to a voltage line $V_{DD}$ so that the sense lines can be precharged.

The logic used to generate some of the read/write commands and data buffer enabling signals will now be discussed. A timing signal $\phi 2'$ is coupled to control electrodes of transistors 97, 98, and 99. An inverter 96 inverts the signal to transistor 98. Transistors 97 and 98 are connected in series between ground and $V_{DD}$. Transistor 97 is in parallel with transistor 99. The output from transistors 97 and 98 is inverted by inverter 101 and connected to an input of NOR gate 102. The output also goes to an input of AND gate 104. NOR gate 102 also receives a read input, R, signal from NOR gate 73 and an input from AND gate 103. Clock signal $\phi 2$ and a read/write signal are supplied to the inputs of AND gate 103. The read/write signal is also connected to an input of AND gate 104. The output of AND gate 104 goes to NOR gate 106. The output of NOR gate 106 is connected to an input of NOR gate 84. NOR gate 84 supplies the enable signal for switching transistor 63. Clock signal $\phi 2$ appears on conductor 83 which is connected to an input of NOR gate 84. Conductor 83 also provides the enable signal for transistor 86 and an input for NOR gate 81. When transistor 86 is enabled it couples timing signal BID1 to inverter 82. Inverter 82 supplies an input for NOR gate 81 and the output of NOR gate 81 is an input for NOR gate 79. NOR gate 79 supplies a synchronizing signal for transistor 46 to enable the data out of the RAM to be coupled to the output buffer. Timing signal BID1 is coupled to NOR gates 88 and 89 by transistors 92 and 93, respectively. Transistors 92 and 93 are enabled by clock signal or clock pulse $\phi 2$ which also serves as an input signal for NOR gates 88 and 89. The output of NOR gate 89 goes to NOR gate 106 and to NOR gate 78. The output of NOR gate 88 goes to transistor 61 which couples input data from external data bus 53 to the microprocessor internal data bus 62. NOR gate 88 has a third input coming from NOR gate 87, and NOR gate 89 also has a third input coming from inverter 77. The output of inverter 77 is coupled to inputs of NOR gates 87 and 89 by transistors 91 and 94, respectively. Transistors 91 and 94 are enabled by clock signal $\phi 2$.

RAM Enable signal, RE, is received into the RAM control logic by inverter 64. The output of inverter buffer 64 is coupled by transistor 66 to a latch having inverters 68, 69 and transistor 71. Transistor 71 provides feedback, from the series connected inverters 68 and 69, by coupling the output of inverter 69 back to the input of inverter 68. Transistor 71 is enabled by standby voltage $V_{ST}$. An output is also taken from a node 70 formed by inverters 68 and 69 and is used to enable transistor 114 and to provide an input to inverter 72. Clock pulse $\phi 2$ is coupled by inverter 67 to transistor 66 to provide an enable signal for transistor 66. It should be noted that inverters 64, 67, 68, 69 and 72 are all powered by standby voltage, $V_{ST}$. The output of inverter 69 is the output for the latch and goes to NOR gates 73 and 74 to be NORed with other input signals to these NOR gates to produce the read and write signals for the RAM. The write signal appears at the output of NOR gate 74 and is inverted by inverter 76. The read signal from NOR gate 73 goes to inverter 77, NOR gate 78, and to transistor 43. The output of the latch also goes to a control or gate electrode of transistor 116 and to an input of NOR gate 117. Transistor 66 serves as a synchronous coupler coupling the RAM Enable signal from buffer inverter 64 to the latch when transistor 66 is enabled by clock signal $\phi 2$. The output taken from node 70 is coupled by inverter 72 to NOR gate 87 and to transistors connected to row select lines of the RAM such as transistors 122 and 123. Transistors 122 and 123 serve to discharge the row select lines and to hold these lines at a low level or ground whenever the control electrodes of the transistors are enabled by an output from inverter 72. The signal from inverter 72 is known as $\overline{\text{RAM Enable 2}}$ ($\overline{\text{RE2}}$).

Also illustrated in FIG. 2 is circuitry to generate an Address Enable signal, AE. Four series connected inverters 110, 111, 112, and 113 provide an input to NOR gate 117. Clock signal $\phi2$ provides an input to the series of inverters in addition to providing another input for NOR gate 117. Clock pulse $\phi2$ is also coupled to an input of NOR gate 118. The output of NOR gate 117 provides a second input for NOR gate 118. Inverters 110, 111, 112, and 113 serve as a delay means for clock signal $\phi2$. The amount of the delay provided by the inverters can be controlled to a certain extent by varying the physical size of the inverters. Of course, the delay can be further decreased by decreasing the number of inverters or increased by adding additional inverters. The clock signal $\phi2$ input to 118 is coupled through a transistor 114. Transistor 114 has its control electrode connected to the latch. The purpose of transistor 114 is to open up the line that carries clock signal $\phi2$ to NOR gate 118 when the RAM Enable signal is not present. Transistor 116 is used to pull an input of NOR gate 118, that normally carries clock pulse $\phi2$, to ground. Transistor 116 is activated when the RAM Enable signal is in a logic "0" state. This ensures a logic "0" input to NOR gate 118 when the RAM is not enabled. The output of NOR gate 118 provides an Address Enable signal which is connected to an address decoder depicted by NOR gates 119 and 121. It will be understood that the address decoder represented by NOR gates 119 and 121 will have other address coded inputs besides the Address Enable input.

When clock signal $\phi2$ is in a logic "1" state, inverters 110, 111, 112 and 113 will provide a logic "1" level input to NOR gate 117 since there are an even number of inverters. Clock signal $\phi2$ is already directly connected to the input of NOR gate 117. This will mean that NOR gate 117 now has two logic "1" levels on its input. The third input to NOR gate 117 will not have any influence on the output of NOR gate 117 and therefore its output will be a logic "0". This logic "0" appears on one of the inputs of NOR gate 118 and the other input of NOR gate 118 is clock pulse $\phi2$ which was assumed to be a logic "1" level. Transistor 114 will be in a conducting state as long as the RAM Enable signal present at the input of inverter 64 is a logic "1". The inputs of gate 118 being logic "1's" will cause a logic "0" at the output of NOR gate 118 and therefore does not serve to inhibit address the decoder.

At the trailing edge of clock pulse $\phi2$ the directly connected input to gate 117 will go to a logic "0" level while the input coupled by the delay means will remain at a logic "1" level for a predetermined period of time equal to the amount of delay provided by sequential inverters 110, 111, 112 and 113. Therefore the output of NOR gate 117 which is connected to NOR gate 118 will remain at a logic "0" level for the predetermined period of time, and the other input to NOR gate 118 which is directly connected to the clock pulse $\phi2$ will become a logic "0" level thereby producing a logic "1" level at the output of NOR gate 118. This positive or logic "1" output is connected to the address decoder and serves to inhibit the address decoder for a period of time equal to the delay of inverters 110-113. During the short period of time that the Address Enable signal inhibits the address decoder the row select lines are held in a logical low state. This helps to alleviate the problem of charge splitting and coupling, which is sometimes called pattern sensitivity, caused by the address code changing at the input of the address decoder. Otherwise, the previous signal on the sense line could tend to change the state of the next address memory cell. During the time that the address decoder is inhibited, the sense lines are pulled up to a logic level "1" by pull up devices 126. Inhibiting the address decoder at the trailing edge of clock pulse $\phi2$ also alleviates the multiple select/deselect problem which is caused by the overlapping of signals on the row select lines. Such overlapping can cause a new cell to be selected prior to a previously addressed sense line being completely deselected. The multiple select/deselect problem could also be caused should one decoder gate change outputs faster than another decoder gate which would cause a momentary erroneous address.

Since the RAM is on the same integrated circuit chip where the address is generated, process variations cancel each other out. If process variations should tend to make the addressing circuitry slower, then of course, the sequential inverters 110, 111, 112, and 113 will then provide a longer delay and vice versa. The length of the delay provided by the sequential inverters should be at least equal to the time it takes an address signal to get from the address registers to the RAM address decoder. The important thing is to produce a pulse which is long enough to block out undesired address pulses, and as indicated hereinbefore one way of accomplishing this is by selecting the proper number of gates or inverters.

Just prior to a power down condition the RAM Enable signal and the clock pulse $\phi2$ are commanded to a logic "0" state. This causes a logic "1" level to appear at the input of inverter 68 since synchronous coupler 66 is enabled by the logic "1" level coming from inverter 67. The output of inverter 69 will also be a logic "1" level and is coupled back to the input of inverter 68 by feedback coupling means 71. The logic "1" level from inverter 69 is connected to the inputs of the read and write logic gates which serves to inhibit the read and write logic circuitry. This prevents any information from being read into or out of the RAM in a power down condition. The output of inverter 68, which will be a logic "0" level, disables transistor 114 whereas transistor 116 is enabled by the output of inverter 69 thereby causing the input to NOR gate 118 to be a logic "0". The logic "1" on the output of inverter 69 is connected to an input of NOR gate 117 thereby causing NOR gate 117 to produce a logic "0" level output. The two logic "0's" on the input of NOR gate 118 causes its output to be a logic "1" thereby inhibiting the address decoder. The output of the address decoder pulls the row select lines to a "0" level. The output of inverter 68 is also connected to an input of inverter 72. The output of inverter 72 produces signal $\overline{\text{RE2}}$ which, as stated hereinbefore, activates transistors 122 and 123 further ensuring that the row select lines remain in a "0" state.

FIG. 3 better illustrates the action of $\overline{\text{RE2}}$ upon the row select lines. As shown in FIG. 3 transistors 142 perform the same function as the transistors illustrated as 122 and 123 in FIG. 2. It should be noted that transistors 142 are located at each end of the row select lines which therefore cause the row select lines to be pulled down to a "0" level at each end while the address decoder 144, which is connected to the midpoint of the row select lines, pulls the midpoint down to a "0" level. FIG. 3 illustrates eight different 8-bit groups of memory cells in the RAM. The eight groups are 131, 132, 133, 134, 135, 136, 137, and 138. Group 131 is shown in greater detail than the other groups. A plurality of memory cells 130 make up group 131. Each cell 130 is connected to address decoder 144 by row select lines 141. Row select lines 141 are coupled to a 0 volt reference or ground conductor 143 by transistors 142. The control electrodes of transistors 142 are connected to lines 147 and 148 which carry the $\overline{RE2}$ signal. The sense amplifier 146 of group 131 is coupled to selectable sense lines by command of signals Y0 through Y7.

Figure 4A:
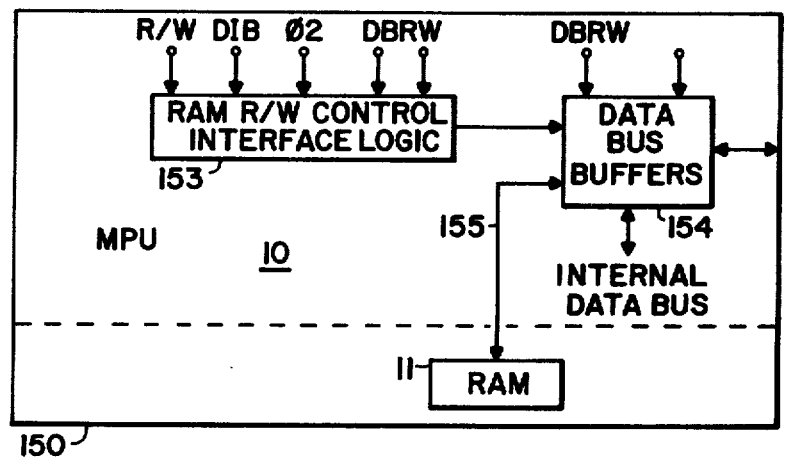
FIGS. 4A and 4B show portions of the circuitry of FIG. 2 in block diagram form.
Figure 4B:
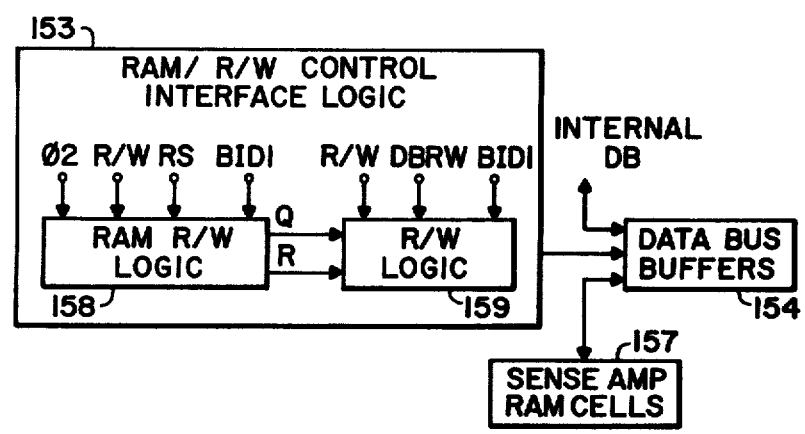

In FIG. 4A, a single integrated circuit chip 150 contains microprocessor unit 10 and RAM 11. The RAM read/write control and interface logic 153 and data bus buffers 154 are shown in block diagram form. Data bus buffers 154 are connected to RAM 11 by line 155. The data bus buffers are also capable of receiving and sending information to the microprocessor internal data bus. Various of the timing signals required for RAM read/write control and interface logic 153 are indicated as inputs to logic 153. FIG. 4B shows a block diagram of a portion of FIG. 4A in a little greater detail. RAM read/write control interface logic 153 includes RAM read/write logic 158 and read/write logic 159. Data bus buffers 154 are connected to RAM cell sense amplifier 157.

By now it should be appreciated that there has been provided an on-chip RAM from which data can be outputted directly on to the internal microprocessor data bus. In addition RAM retention is accomplished during power down and power up conditions and an address inhibit signal is applied to address decoder during a period of time immediately following an addressed access to the RAM.

Consequently, while in accordance with the Patent Statutes, there has been described what at present are considered to be the preferred forms of the invention, it will be obvious to those skilled in the art that numerous changes and modifications may be made herein without departing from the spirit and scope of the invention, and it is therefore aimed in the following claims to cover all such modifications.

What is claimed as new and desired to secure by Letters Patent of the United States is:

1. An integrated circuit microprocessor having an on-chip RAM and including circuitry to interconnect the RAM to an internal data bus of the microprocessor and to an external data bus which interfaces to the integrated circuit microprocessor, the circuitry comprising: a sense amplifier coupled to the on-chip RAM and having an output; at least one buffer coupled to the output of the sense amplifier for buffering the output of the sense amplifier thereby providing a buffered output; a bilateral switch coupled between the buffered output of the at least one buffer and the internal data bus, the bilateral switch controllably providing an interconnect between the RAM and the internal data bus, the bilateral switch including a transistor coupling the buffered output of the at least one buffer to the microprocessor internal data bus; a logic gate having an output and at least a first and a second input, the first input of the logic gate being coupled to the at least one buffer, the second input of the logic gate being coupled to a switching signal and the output of the logic gate being coupled to the external data bus so that the logic gate can logically combine signals on the first and second inputs of the logic gate; and a second buffer having an input and an output, the second buffer controllably coupled between the external data bus and the internal microprocessor bus, the second buffer having an input coupled to the external data bus and having an output coupled to the internal microprocessor bus thereby providing buffering between the external data bus and the internal microprocessor bus.

2. An integrated circuit microprocessor system including an on-chip RAM and having circuitry for interconnecting the RAM to an external data bus, which interfaces with the integrated circuit microprocessor, and to an internal microprocessor data bus, the circuitry comprising: a sense amplifier coupled to the RAM and having an output; a first buffer coupled to the output of the sense amplifier and providing an output, the first buffer being for buffering the output of the sense amplifier; a second buffer for coupling the output of the first buffer to the external data bus, the second buffer providing additional buffering to the output of the first buffer; a bilateral switch coupled to the output of the first buffer for controllably switching the output of the first buffer to the internal microprocessor data bus; and a third buffer for coupling the external data bus to the internal microprocessor data bus thereby providing buffering between the external data bus and the internal microprocessor bus.

3. The microprocessor system of claim 2 further including a controllable coupler for controllably coupling the output of the first buffer to the bilateral switch.

4. The microprocessor system of claim 3 wherein the bilateral switch is a transistor coupled between the internal microprocessor data bus and the controllable coupler.

5. A single integrated circuit chip containing a microprocessor and a RAM and having circuitry for interconncting the RAM to an internal microprocessor data bus, the circuitry comprising: a sense amplifier coupled to the RAM and providing an output which is an output from the RAM; a first buffer coupled to the sense amplifier for buffering the output of the sense amplifier and thereby providing a buffered output; a first controllable coupler coupled to the output of the first buffer and controlled by a read signal for coupling the buffered output of the sense amplifier; a second buffer coupled to the first buffer by the first controllable coupler for further buffering the output of the sense amplifier; a second controllable coupler connected to the second buffer for coupling an output from the second buffer; and a bilateral switch coupled to the second controllable coupler to switch data from the RAM to the internal microprocessor data bus whenever it is desired to transfer data from the RAM to the internal microprocessor data bus.

6. The integrated circuit chip of claim 5 wherein the first and second buffers are inverters having field effect transistors.

7. The integrated circuit chip of claim 6 wherein the first and second controllable couplers are field effect transistors.

* * * * *